United States Patent [19]

Hellermann et al.

[11] Patent Number: 5,942,307
[45] Date of Patent: Aug. 24, 1999

[54] LIGHTWEIGHT BUILDING BOARD

[75] Inventors: Walter Hellermann, Dorsten; Christian Baron, Haltern; Juergen Finke, Marl; Hubertus Ohm, Haltern, all of Germany

[73] Assignee: Huels Aktiengesellschaft, Marl, Germany

[21] Appl. No.: 08/662,762

[22] Filed: Jun. 10, 1996

[30] Foreign Application Priority Data

Aug. 1, 1995 [DE] Germany .............................. 195 28 251

[51] Int. Cl.$^6$ .............................. B32B 3/12; B31B 1/60; B29C 65/00
[52] U.S. Cl. .......................... 428/116; 156/60; 156/304.6; 428/34.7; 428/35.7
[58] Field of Search ................... 428/34.7, 35.7, 428/116; 156/60, 304.6

[56] References Cited

U.S. PATENT DOCUMENTS

| | | | |
|---|---|---|---|
| 5,084,518 | 1/1992 | George et al. ............................ | 525/184 |
| 5,112,916 | 5/1992 | Nakahashi et al. ...................... | 525/183 |
| 5,122,420 | 6/1992 | Baron et al. ........................... | 428/474.4 |
| 5,194,121 | 3/1993 | Taguchi et al. ........................ | 162/358.1 |
| 5,404,915 | 4/1995 | Muegge et al. ......................... | 138/137 |
| 5,443,874 | 8/1995 | Tachi et al. ........................... | 428/476.1 |
| 5,670,576 | 9/1997 | Takatani et al. ........................ | 525/183 |
| 5,683,782 | 11/1997 | Duchene ................................ | 428/116 |
| 5,686,173 | 11/1997 | Fujii et al. ........................... | 428/476.1 |

FOREIGN PATENT DOCUMENTS

| | | |
|---|---|---|
| 42 08 812 | 9/1993 | Germany . |
| 43 02 628 | 8/1994 | Germany . |
| 43 14 861 | 11/1994 | Germany . |

*Primary Examiner*—Deborah Jones
*Assistant Examiner*—Cathy F. Lam
*Attorney, Agent, or Firm*—Oblon, Spivak, McClelland, Maier & Neustadt, P.C.

[57] ABSTRACT

A multilayered lightweight building board, comprising a support core, two cover layers on the support core, where the support core is made of laterally fused-together tubes. The tubes have an inner layer, and an outer layer, where the outer layer has a softening point 10–90° C. lower than the softening point of the inner layer. The lightweight building board is made from compatible thermoplastic materials, so they can be mechanically recycled by the customary processing methods for thermoplastics.

19 Claims, No Drawings

LIGHTWEIGHT BUILDING BOARD

BACKGROUND OF THE INVENTION

1. Field of the Invention

This invention relates to a multilayered lightweight building board with a support core and firm interconnection between the individual layers.

2. Discussion of the Art

Lightweight building boards combine high strength with low weight. They have a support core, for example a honeycomb structure, and cover layers applied to the end faces of the support core.

The function of the support core is to keep the two cover layers a given distance apart, even under a high load. The support core also transmits the induced forces from one cover layer to the other.

DE-A-42 08 8312 describes a multilayered lightweight building board with a support core, where the support core and the cover layers are made of the same thermoplastic material. The support core may have a honeycomb structure and contain individual, laterally joined-together tube sections. These tube sections have been joined together by various chemical adhesives, for example epoxides or polyurethanes. To ensure recyclability, however, the tubes of the support core must be made from a single thermoplastic material, ruling out bonding by means of an adhesive. It would be conceivable to join the tube sections together in a parallel arrangement of the axes by thermal welding, but this would require precise temperature control, which is difficult to achieve. In addition, the structure could deform appreciably, distinctly reducing the mechanical parameters of the support core compared with an optimum tube-based structure.

SUMMARY OF THE INVENTION

An object of the present invention is to provide multilayered, support core, lightweight building boards.

Another object of the present invention is to provide building boards with a support core containing individual tube sections joined together laterally.

Another object of the present invention is to provide a support core of tube sections joined together in a simple way, so that the tube-based structure is maintained without significant deformation.

Still another object of the present invention is to provide building boards made from compatible thermoplastic materials, so that the boards are mechanically recyclable by customary processing methods for thermoplastics.

These objectives are achieved by a board, having a support core, two cover layers on the support core, where the support core is made of laterally fused-together tubes. The tubes have an inner layer, and an outer layer, where the outer layer has a softening point 10–90° C. lower than the softening point of the inner layer.

Another aspect of the invention are tubes, having an inner layer and an outer layer, where the outer layer has a softening point 10–90° C. lower than the softening point of the inner layer.

Still another aspect of the invention is a method of making boards, by fusing tubes together laterally, thereby forming a support core, and applying to the support core two cover layers.

The multilayered lightweight building board has a support core of individual, laterally fused-together tube sections, as well as two joined-together cover layers.

DETAILED DESCRIPTION OF THE INVENTION

The two-layered tube sections are produced by coextrusion of tubes which are subsequently cut to the desired length. The coextrusion of multilayer tubes is known, and the individual layer thicknesses can be set in a known manner, provided the viscosity and the processing temperatures of the molding compounds are not too far apart. In a preferred embodiment, the outer layer contains from 10 to 50% of the total layer thickness. It is further preferred for the outer layer to have a softening point from 20 to 60° C. lower than that of the inner layer. The softening point is measured by Vicat method A (10 N) in accordance with ISO 306 (DIN 53 460).

It is important for the purposes of this invention that there is adhesion between the inner and outer layers of the tubes. This can be achieved most simply when the two molding compounds used resemble each other. In addition, there are pairs of materials which, although chemically different, are physically compatible with each other or will react with each other, and so form sites of adhesion.

Some possibilities will now be recited, by way of example, which, however, are not intended to restrict the scope of the invention in any way:

(1) An inner layer of a polyamide (PA), with an outer layer of another polyamide compatible with the inner layer:
(a) Inner layer: PA 66;
Outer layer: PA 6.
(b) Inner layer: a homopolyamide such as PA 12, PA 11, PA 1012, PA 612, PA 6 or PA 66; Outer layer: a copolyamide derived therefrom.

(2) Inner layer: a polyamide such as PA 66; Outer layer: a backbone or graft copolymer reactive with the polyamide, for example, one base on styrene and maleic anhydride, styrene and glycidyl methacrylate, or propene and maleic anhydride.

(3) Inner layer: a relatively high melting point reactive copolymer, such as a polyglutarimide (M. R. Kricheldorf, Handbook of Polymer Synthesis, Part A, Marcel Dekker Inc., New York-Basle-Hong Kong, page 223 et seq.; H. G. Elias, Makromoleküle, Hüthig und Wepf Verlag, Basle-Heidelberg-New York; U.S. Pat. Nos. 2,146,209 and 4,246,374) or a styrene/maleimide/optionally maleic anhydride copolymer; Outer layer: a relatively low melting point polyamide, such as PA 12.

(4) Inner layer: a polyester, such as polyethylene terephthalate or polybutylene terephthalate; Outer layer: a copolymer derived from the polyester with a comonomer, such as adipic acid, dodecanedioic acid, Isophthalic acid, 1,4-cyclohexanedimethanol or 2-butene-1,4-diol.

(5) Inner layer: a polyester, such as polybutylene terephthalate; Outer layer: a polybutylene terephthalate/polycarbonate blend.

(6) Inner layer: a polyarylate, for example one based on terephthalic acid/isophthalic acid/bisphenol A; Outer layer: a polycarbonate.

(7) Inner layer: a polyphenylene ether, for example, prepared by oxidative coupling of 2,6-dimethylphenol; Outer layer: a polystyrene or a polyphenylene ether/polystyrene blend.

(8) Inner layer: a polyolefin, such as isotactic polypropylene; Outer layer: a polyolefin compatible therewith, for example, polybutene-1, a propene/ethene copolymer, a propene/ethene/butene-1 terpolymer or a blend of isotactic Polypropylene and a substantially amorphous polyolefin such as atactic polypropylene or substantially amorphous co- or terpolymers based on propene, butene-1 and/or ethene.

To obtain greater stiffness, the molding compound of the inner layer and also—less preferably—the molding compound of the outer layer, may contain reinforcing fibers, for example glass, carbon or aramid fibers.

In a preferred embodiment the inner layer contains PA 12 or PA 11 and the outer layer contains a copolyamide containing from 40 to 90% by weight of monomeric units derivable from laurolactam or ω-aminoundecanoic acid, and from 60 to 10% by weight of monomeric units derivable from equimolar amounts of aliphatic or aromatic dicarboxylic acids and aliphatic or cycloaliphatic diamines.

Suitable dicarboxylic acids here include compounds of the general formula HOOC—R—COOH, where R is a branched or unbranched aliphatic or aromatic radical, for example azelaic acid, sebacic acid, decanedicarboxylic acid, isophthalic acid and also preferably adipic acid, dodecanedicarboxylic acid or a dimer fatty acid. Suitable diamines include compounds of the general formula $H_2N—R'—NH_2$, where R' is a branched or unbranched aliphatic or cycloaliphatic radical with or without interruption by one or more identical or different heteroatoms (e.g. N, O, S); examples are hexamethylenediamine, trimethylhexamethylenediamine, 5-methylnonamethylenediamine, decamethylenediamine, dodecamethylenediamine, 2,4-dimethyloctamethylenediamine, isophoronediamine, bis(p-aminocyclohexyl)methane, 1,4-bisaminomethylcyclohexane and also bis(3-methyl-4-aminocyclohexyl)methane. R may have from 2–20 carbon atoms, preferably 4–12. R' may have from 2–20 carbon atoms, preferably 6–15.

Tube sections of the two-layer tubes used in this invention can be welded together easily via the lower melting outer layer without causing the higher melting inner layer to soften. The tube sections are thus not noticeably deformed, so that the structure of the honeycomb core remains intact.

Thermoplastic cover layers can be applied to the support core thus produced. A glass fiber reinforced plastics laminate can also be applied, under wet conditions with the aid of an epoxy or polyester resin. In the latter case, recyclability is restricted to the support core.

In a preferred embodiment, however, the cover layers are composed of the same material as used for producing the tubes, more particularly the same material as the inner layer. In this case, support core and cover layers can be melted together without problems, for example as described DE-A-42 0 8 812.

If the cover layers contain the sa me material as the inner layer of the tubes, it can be advantageous to first laminate the support core, on one or both sides, with a film of the same material as the outer layer of the tubes, before the cover layers are applied. Alternatively, such a film can first be laminated onto the surface of a cover layer, which is then joined to the support core. This permits a particularly simple melting-together of support core and cover layers.

The cover layers may also contain a different material than the tubes, as long as the materials are compatible, making it possible to join the support core and cover layers in an adhesion-based bond. The support core and cover layers can also be joined together in an adhesion-based bond via an interposed film. For example, a support core based on polybutylene terephthalate and cover layers based on PA 12 can be firmly fused together via an interposed film comprising a polyester hot-melt adhesive containing isocyanate groups. Alternatively, the cover layer or the upper and lower surfaces of the support core can be coated with such a hot-melt adhesive by means of customary hot-melt technology.

The cover layers may contain an unreinforced molding compound or a molding compound reinforced with cut fibers. Such cover layers are particularly easy to produce by plate extrusion. To obtain maximum strength, however, preferably the cover layers are reinforced with uncut fibers, for example with wovens, U D (unidirectional) tapes or rovings. The production of such layered materials is known; for example, such polyamide are described in EP-A-0 422 358. The cut or uncut fibers used are customarily glass, carbon or aramid fibers, used alone or in combination.

To recycle the lightweight building boards of this invention, the boards are first ground, causing the uncut fibers in the cover layers to be chopped into short fibers. The material obtained can then, for example, be reused for producing cover layers.

Having generally described this invention, a further understanding can be obtained by reference to certain specific examples which are provided herein for purposes of illustration only and are not intended to be limiting unless otherwise specified.

EXAMPLES

A. Molding compounds used:
   PA α: A commercially available PA 12 with an $\eta_{rel}$ value (measured on a 0.5% strength by weight solution in m-cresol at 25° C. in accordance with DIN 53 727/ISO 307) of 2.1 and a Vicat softening temperature measured by method A (10 N) of ISO 306 (DIN 53 460) of 170° C.
   PA β: A copolyamide prepared from 65 mol % of laurolactam and 35 mol% of the salt of dodecanedioic acid and isophoronediamine, and also 0.005% by weight of $H_3PO_2$ as a catalyst by hydrolytic polycondensation at temperatures of 260 to 280° C. and pressures of 18 to 20 bar, release of the water vapor and granulation of the extruded melt. Solution viscosity $\eta_{rel}$=2. 01; Vicat method A softening temperature 135–140° C.

B. Extrusion of the multilayer tubes:
   The tubes are produced by coextrusion, one extruder being fed with the material of the outer layer (PA β) and one extruder with the material of the inner layer (PA α).

C. Making of the support core
   Tube sections are combined into packets with their axes in a parallel arrangement. Hot air is passed through the packets, melting the outer layer, and causing the tubes to adhere together. Cutting transversely to the tube axes then results in the honeycomb support cores.

D. Making of cover layers
   PA 12 powder ($\eta_{rel}$=1.6) is sprinkled onto glass fiber fabric; the fabric is then impregnated by passage through an infrared radiator which heats the polymer to about 200° C. The low melt viscosity of the PA 12 permits good penetration of the polymer into the fiber bundles, and hence good impregnation of the fabric. To obtain complete wetting of all the fibers, three prepreg plies are superposed and consolidated in a stationary press at 250° C. and 8 bar.

E. Lightweight building boards
   The appropriately trimmed support core is placed together with the cover layers and two inserted films containing the same material as the outer layer of the tubes (PA α) in a suitable frame, in a preheated press. They are then pressed together at 150° C. and 8 bar.

Obviously, numerous modifications and variations of the present invention are possible in light of the above teachings. It is therefore to be understood that within the scope of the appended claims, the invention may be practiced otherwise than as specifically described herein.

The priority document of this application, German Patent Application 195 28 251.5, filed Aug. 1, 1995, is hereby incorporated by reference.

What is claimed as new and desired to be secured by Letters Patent of the United States is:

1. A board, comprising:
   (a) a support core;
   (b) a first cover layer, on said support core; and
   (c) a second cover layer, on said support core;
   wherein said support core comprises fused-together tubes with their axes in a parallel arrangement, and
   said tubes comprise
   (i) an inner layer comprising a first material, and
   (ii) an outer layer comprising a second material, wherein said second material has a softening point 10–90° C. lower than the softening point of said first material; and
   wherein said first cover is on the upper side transverse to the tube axes and said second cover is on the lower side transverse to the tube axes.

2. The board of claim 1, wherein said second material has a softening point 20–60° C. lower than the softening point of said first material.

3. The board of claim 1, wherein said outer layer has a thickness which is 10–50% of the total combined thickness of the inner and outer layers.

4. The board of claim 1, wherein said first material is polyamide 12 or polyamide 11, and said second material is a copolyamide containing:
   (I) 40–90% by weight of monomeric units derivable from laurolactam or ω-aminoundecanoic acid, and
   (II) 60–10% by weight of monomeric units derivable from equimolar amounts of (A) aliphatic or aromatic dicarboxylic acids, and (B) aliphatic or cycloaliphatic diamines.

5. The board of claim 4, wherein said aliphatic or aromatic dicarboxylic acids are selected from the group consisting of azelaic acid, sebacic acid, decanedicarboxylic acid, isophthalic acid, adipic acid and dodecanedicarboxylic acid; and
   wherein said aliphatic or cycloaliphatic diamines are selected from the group consisting of hexamethylenediamine, trimethylhexamethylenediamine, 5-methylnonamethylenediamine, decamethylenediamine, dodecamethylenediamine, 2,4-dimethyloctamethylenediamine, isophoronediamine, bis(p-aminocyclohexyl)methane, 1-4-bisaminomethylcyclohexane and bis(3-methyl-4-aminocyclohexyl)methane.

6. The board of claim 1, further comprising a first film between said first cover layer and said support core; and
   a second film between said second cover layer and said support core;
   wherein said first and said second films comprise said second material.

7. The board of claim 1, wherein said support core has a honeycomb structure.

8. The board of claim 5, further comprising a first film between said first cover layer and said support core; and
   a second film between said second cover layer and said support core;
   wherein said first and said second films comprise said second material.

9. A tube, comprising:
   (i) an inner layer comprising a first material, and
   (ii) an outer layer comprising a second material, wherein said second material has a softening point 10–90 0C. lower than the softening point of said first material,
   said first material is polymide 12 or polyamide 11, and
   said second material is a copolyamide containing:
   (I) 40–90% by weight of monomeric units derivable from laurolactam or ω-aminoundecanoic acid, and
   (II) 60–10% by weight of monomeric units derivable from equimolar amounts of (A) aliphatic or aromatic dicarboxylic acids, and (B) aliphatic or cycloaliphatic diamines.

10. The tube of claim 9, wherein said aliphatic or aromatic dicarboxylic acids are selected from the group consisting of azelaic acid, sebacic acid, decanedicarboxylic acid, isophthalic acid, adipic acid and dodecanedicarboxylic acid; and
    wherein said aliphatic or cycloaliphatic diamines are selected from the group consisting of hexamethylenediamine, trimethylhexamethylenediamine, 5-methylnonamethylenediamine, decamethylenediamine, dodecamethylenediamine, 2,4-dimethyloctamethylenediamine, isophoronediamine, bis(p-aminocyclohexyl)methane, 1-4-bisaminomethylcyclohexane and bis(3-methyl-4-aminocyclohexyl)methane.

11. The tube of claim 9, wherein said outer layer has a thickness which is 10–50% of the total combined thickness of the inner and outer layers.

12. A method, comprising:
    fusing tubes together laterally, thereby forming a support core; and
    applying to said support core a first cover layer and a second cover layer;
    wherein said tubes comprise
    (i) an inner layer comprising a first material, and
    (ii) an outer layer comprising a second material,
    wherein said second material has a softening point 10–90° C. lower than the softening point of said first material.

13. The method of claim 12, wherein said second material has a softening point 20–60° C. lower than the softening point of said first material.

14. The method of claim 12, wherein said outer layer has a thickness which is 10–50% of the total combined thickness of the inner and outer layers.

15. The method of claim 12, wherein said first material is polyamide 12 or polyamide 11, and
    said second material is a copolyamide containing:
    (I) 40–90% by weight of monomeric units derivable from laurolactam or ω-aminoundecanoic acid, and
    (II) 60–10% by weight of monomeric units derivable from equimolar amounts of (A) aliphatic or aromatic dicarboxylic acids, and (B) aliphatic or cycloaliphatic diamines.

16. The method claim 15, wherein said aliphatic or aromatic dicarboxylic acids are selected from the group consisting of azelaic acid, sebacic acid, decanedicarboxylic acid, isophthalic acid, adipic acid and dodecanedicarboxylic acid; and
    wherein said aliphatic or cycloaliphatic diamines are selected from the group consisting of hexamethylenediamine, trimethylhexamethylenediamine, 5-methylnonamethylenediamine, decamethylenediamine, dodecamethylenediamine, 2,4-dimethyloctamethylenediamine, isophoronediamine, bis(p-aminocyclohexyl)methane, 1-4-bisaminomethylcyclohexane and bis(3-methyl-4-aminocyclohexyl)methane.

17. The method of claim 12, further comprising a first film between said first cover layer and said support core; and
   a second film between said second cover layer and said support core;
   wherein said first and said second films comprise said second material.

18. The method of claim 12, wherein said support core has a honeycomb structure.

19. The method of claim 16, further comprising a first film between said first cover layer and said support core; and
   a second film between said second cover layer and said support core;
   wherein said first and said second films comprise said second material.

* * * * *